(12) United States Patent
Wang et al.

(10) Patent No.: US 10,718,989 B2
(45) Date of Patent: Jul. 21, 2020

(54) ELECTRICALLY TUNABLE FOCUSING ACHROMATIC LENS

(71) Applicant: NATIONAL CHIAO TUNG UNIVERSITY, Hsinchu (TW)

(72) Inventors: Yu-Jen Wang, Taipei (TW); Hung-Chun Lin, Hsinchu (TW); Yi-Hsin Lin, Zhubei (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 16/284,548

(22) Filed: Feb. 25, 2019

(65) Prior Publication Data

US 2020/0110324 A1   Apr. 9, 2020

(30) Foreign Application Priority Data

Oct. 4, 2018 (TW) .............................. 107135035 A

(51) Int. Cl.
*G02F 1/29* (2006.01)
*G02F 1/1347* (2006.01)

(52) U.S. Cl.
CPC .............. *G02F 1/29* (2013.01); *G02F 1/1347* (2013.01); *G02F 1/13471* (2013.01); *G02F 2001/294* (2013.01)

(58) Field of Classification Search
CPC .... G02F 1/29; G02F 2001/294; G02F 1/1347; G02F 1/13471
See application file for complete search history.

(56) References Cited

U.S. PATENT DOCUMENTS

2017/0017104 A1* 1/2017 Lin ..................... G02F 1/13471
2019/0285891 A1* 9/2019 Lam ................... G02B 27/0025

FOREIGN PATENT DOCUMENTS

WO   WO 2015/151298 A1   10/2015

OTHER PUBLICATIONS

Chang, Kai-Han et al.; "Electrically tunable liquid crystal lens with suppressed axial chromatic aberration"; Appl. Phys. Lett.; 111; 2017; 6pp.
Stone, Thomas et al.; "Hybrid diffractive-refractive lenses and achromats"; Applied Optics; vol. 27; No. 14; Jul. 15, 1988; 12pp.
(Continued)

*Primary Examiner* — Nathanael R Briggs
(74) *Attorney, Agent, or Firm* — Lewis Roca Rothgerber Christie LLP

(57) ABSTRACT

An electrically tunable focusing achromatic lens includes a first liquid crystal cell, a second liquid crystal cell, and first and second electrode layer units which have two predetermined patterns for permitting two predetermined radially varying electric fields to be generated to across the first and second liquid crystal cells, respectively, to thereby allow one of the first and second liquid crystal cells to acquire a predetermined positive optical power and the other one of the first and second liquid crystal cells to acquire a predetermined negative optical power. When an incident light passes through the first and second liquid crystal cells, chromatic aberration of the first liquid crystal cell can be counterbalanced by that of the second liquid crystal cell.

6 Claims, 3 Drawing Sheets

(a)

(b)

(56) References Cited

OTHER PUBLICATIONS

Valley, Pouria et al.; "Adjustable hybrid diffractive/refractive achromatic lens"; Optics Express; vol. 19; No. 8; Apr. 11, 2011; pp. 7468-7479.
H.C. Lin, M.S. Chen, and Y.H. Lin; "A Review of Electrically Tunable Focusing Liquid Crystal Lenses," Transactions on Electrical and Electronic Materials 12(6), 234-240 (2011) (On Order).
Y.H. Lin and H.S. Chen; "Electrically tunable-focusing and polarizer-free liquid crystal lenses for ophthalmic applications," Opt Express 21(8), 9428-9436 (2013) (On Order).

* cited by examiner

ELECTRICALLY TUNABLE FOCUSING ACHROMATIC LENS

CROSS-REFERENCE TO RELATED APPLICATION

This application claims priority from Taiwanese invention patent application no. 107135035, filed on Oct. 4, 2018.

FIELD

The disclosure relates to an electrically tunable focusing liquid crystal lens, more particularly to an electrically tunable focusing achromatic lens.

BACKGROUND

A conventional electrically tunable focusing liquid crystal lens is disclosed by H. C. Lin, M. S. Chen, and Y. H. Lin in an article entitled "A Review of Electrically Tunable Focusing Liquid Crystal Lenses," Transactions on Electrical and Electronic Materials 12(6), 234-240 (2011).

A conventional polarizer free liquid crystal lens is disclosed by Y. H. Lin and H. S. Chen in an article entitled "Electrically tunable-focusing and polarizer-free liquid crystal lenses for ophthalmic applications," Opt Express 21(8), 9428-9436 (2013).

SUMMARY

An object of the disclosure is to provide a new electrically tunable focusing achromatic lens.

According to the disclosure, an electrically tunable focusing achromatic lens includes a first liquid crystal cell for receiving an incident light, a second liquid crystal cell, a first electrode layer unit, and a second electrode layer unit. The first liquid crystal cell includes a pair of first alignment layers which are spaced apart from each other along a normal line, and a plurality of first liquid crystal molecules which have a first dielectric anisotropy and which are filled between and aligned by the first alignment layers to orient in a first orientation. The second liquid crystal cell is disposed rearward of the first liquid crystal cell, and includes a pair of second alignment layers which are spaced apart from each other along the normal line, and a plurality of second liquid crystal molecules which have a second dielectric anisotropy and which are filled between and aligned by the second alignment layers to orient in a second orientation that is orthogonal to or parallel to the first orientation. The first and second electrode layer units are disposed to be separated from each other along the normal line, to supply voltage to the first and second liquid crystal cells, and have two predetermined patterns so as to generate a first predetermined radially varying electric field across the first liquid crystal cell and a second predetermined radially varying electric field across the second liquid crystal cell, such that one of the first and second liquid crystal cells acquires a predetermined positive optical power and the other one of the first and second liquid crystal cells acquires a predetermined negative optical power which has an absolute value different from that of the predetermined positive optical power, to thereby set a predetermined focal length, and such that when the incident light is directed along the normal line and focused at a predetermined focal point determined by the predetermined focal length, chromatic aberration of the first liquid crystal cell can be counterbalanced by that of the second liquid crystal cell to thereby limit the effect of chromatic aberration at the predetermined focal point.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Figure 1:
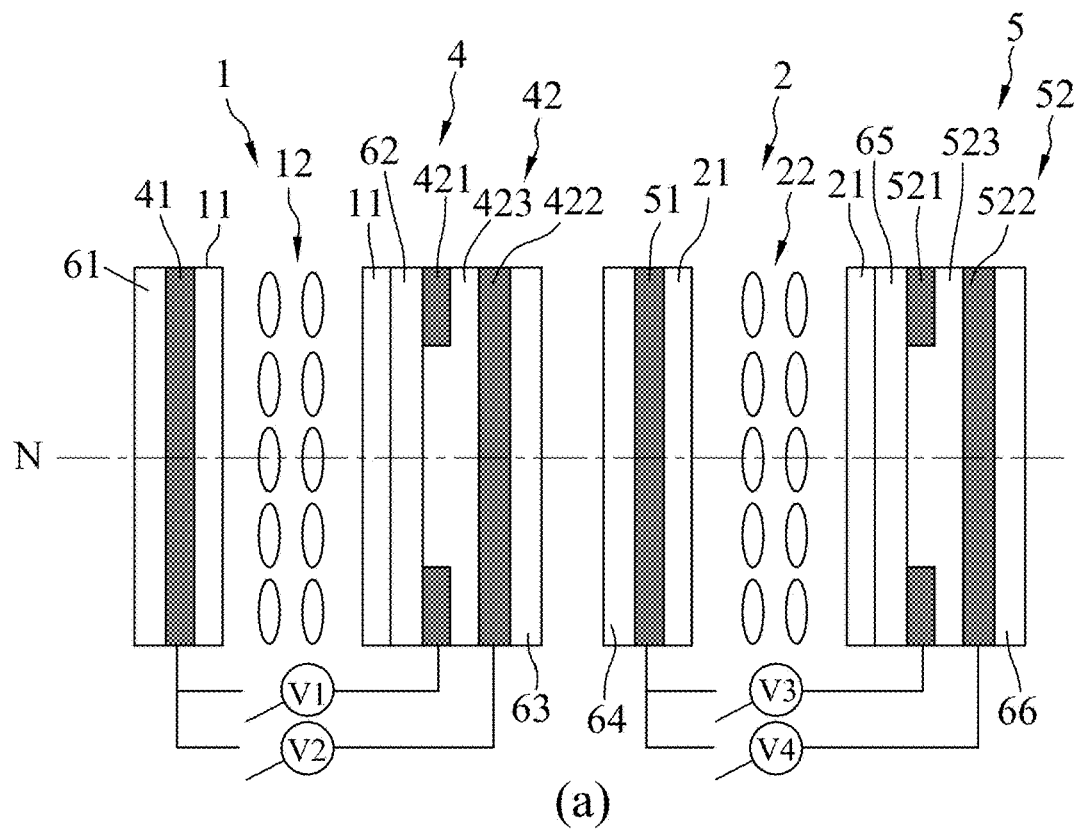
FIG. 1 is a schematic side view of an electrically tunable focusing achromatic lens according to a first embodiment of the disclosure.
Figure 1:
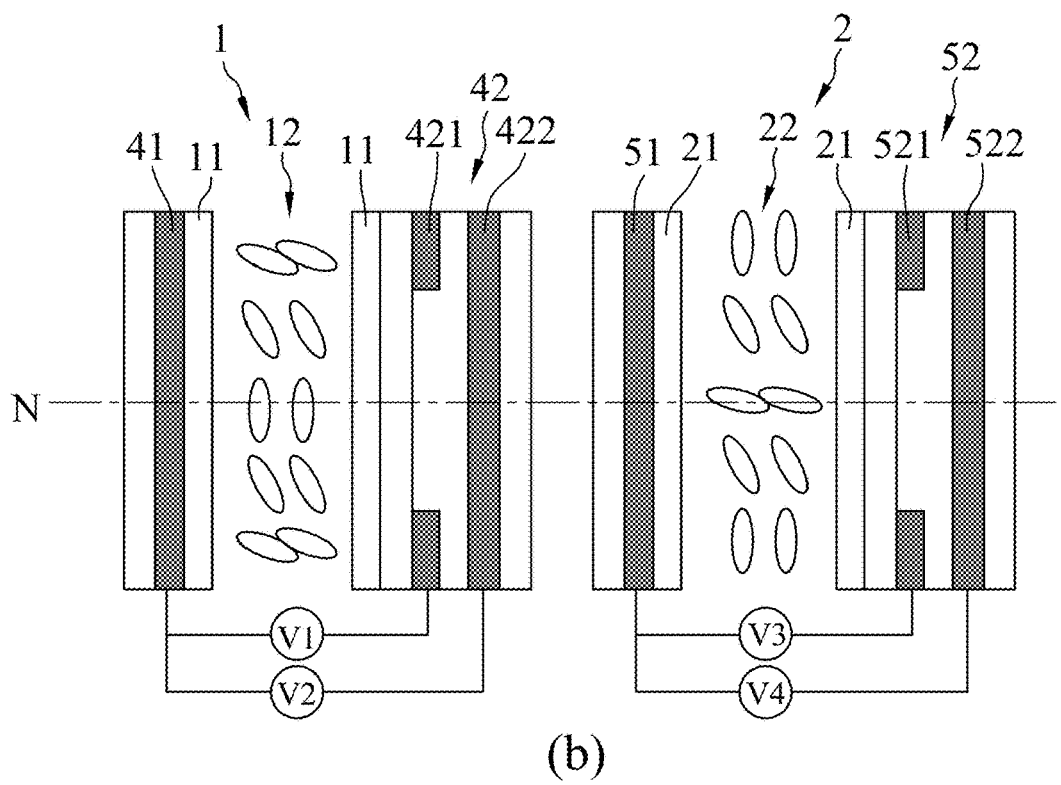

Before the disclosure is described in greater detail, it should be noted that where considered appropriate, reference numerals have been repeated among the figures to indicate corresponding or analogous elements, which may optionally have similar characteristics.

To aid in describing the disclosure, directional terms may be used in the specification and claims to describe portions of the present disclosure (e.g., front, rear, left, right, top, bottom, etc.). These directional definitions are intended to merely assist in describing and claiming the disclosure and are not intended to limit the disclosure in any way.

It should be noted that the drawings, which are for illustrative purposes only, are not drawn to scale, and are not intended to represent the actual sizes or actual relative sizes of the elements described below.

Referring to FIG. 1, an electrically tunable focusing achromatic lens according to a first embodiment of the disclosure is shown to include a first liquid crystal cell 1 for receiving an incident light, a second liquid crystal cell 2, a first electrode layer unit 4, and a second electrode layer unit 5.

The first liquid crystal cell 1 includes a pair of first alignment layers 11 and a plurality of first liquid crystal molecules 12. The first alignment layers 11 are spaced apart from each other along a normal line (N). The first liquid crystal molecules 12 have a first dielectric anisotropy and are filled between and aligned by the first alignment layers 11 to orient in a first orientation (see FIG. 1(a)).

The second liquid crystal cell 2 is disposed rearward of the first liquid crystal cell 1, and includes a pair of second alignment layers 21 and a plurality of second liquid crystal molecules 22. The second alignment layers 21 are spaced apart from each other along the normal line (N). The second liquid crystal molecules 22 have a second dielectric anisotropy, and are filled between and aligned by the second alignment layers 21 to orient in a second orientation that is orthogonal to or parallel to the first orientation (see FIG. 1(a)).

The first and second electrode layer units 4, 5 are disposed to be separated from each other along the normal line (N), to supply voltage to the first and second liquid crystal cells 1, 2, and have two predetermined patterns so as to generate a first predetermined radially varying electric field across the first liquid crystal cell 1 and a second predetermined radially varying electric field across the second liquid crystal cell 2, such that one of the first and second liquid crystal cells 1, 2 acquires a predetermined positive optical power and the other one of the first and second liquid crystal cells 1, 2 acquires a predetermined negative optical power which has an absolute value different from that of the predetermined positive optical power, to thereby set a predetermined focal length, and such that when the incident light is directed along the normal line (N) and focused at a predetermined focal point determined by the predetermined focal length, chromatic aberration of the first liquid crystal cell 1 can be counterbalanced by that of the second liquid crystal cell 2 to thereby limit the effect of chromatic aberration at the predetermined focal point.

It should be noted that because the focal length of the achromatic lens is electrically tunable, the focal length can be varied continuously.

In an embodiment shown in FIG. 1, the first and second dielectric anisotropies are both positive or both negative. As shown in FIG. 1(*a*), when no voltage is applied to each of the first and second liquid crystal cells 1, 2, the first orientation is parallel to the second orientation. Furthermore, as shown in FIG. 1(*b*), when a voltage is applied to each of the first and second liquid crystal cells 1, 2, one of the first and second predetermined radially varying electric fields has a field gradient from high to low in radial directions from the normal line (N), while the other one of the first and second predetermined radially varying electric fields has a field gradient from low to high in the radial directions from the normal line (N).

In an embodiment shown in FIG. 1, the first electrode layer unit 4 has a first front electrode layer 41 and a first rear electrode layer 42. The first front and rear electrode layers 41, 42 are separated from each other along the normal line (N), and are disposed forwardly and rearwardly of the first alignment layers 11, respectively, so as to generate the first predetermined radially varying electric field across the first liquid crystal cell 1.

In addition, the second electrode layer unit 5 has a second front electrode layer 51 and a second rear electrode layer 52. The second front and rear electrode layers 51, 52 are separated from each other along the normal line (N), and are disposed forwardly and rearwardly of the second alignment layers 21, respectively, so as to generate the second predetermined radially varying electric field across the second liquid crystal cell 2.

In an embodiment shown in FIG. 1, the first rear electrode layer 42 includes a first ring electrode 421 extending to surround the normal line (N), and a first electrode film 422 which is disposed rearwardly of the first ring electrode 421, and which is separated from the first ring electrode 421 by a first insulating layer 423. The second rear electrode layer 52 includes a second ring electrode 521 extending to surround the normal line (N), and a second electrode film 522 which is disposed rearwardly of the second ring electrode 521, and which is separated from the second ring electrode 521 by a second insulating layer 523.

In an embodiment shown in FIG. 1, the first and second dielectric anisotropies are both positive. As shown in FIG. 1(*b*), a voltage (V1) applied between the first front electrode layer 41 and the first ring electrode 421 is larger than a voltage (V2) applied between the first front electrode layer 41 and the first electrode film 422 so as to permit the first predetermined radially varying electric field to have a field gradient from low to high in the radial directions from the normal line (N), thereby allow the first liquid crystal cell 1 to acquire the predetermined positive optical power.

In addition, a voltage (V3) applied between the second front electrode layer 51 and the second ring electrode 521 is smaller than a voltage (V4) applied between the second front electrode layer 51 and the second electrode film 522 so as to permit the second predetermined radially varying electric field to have a field gradient from high to low in the radial directions from the normal line (N), thereby allow the second liquid crystal cell 2 to acquire the predetermined negative optical power.

In an embodiment shown in FIG. 1, the first front electrode layer 41 is formed on a rear surface of a substrate 61. A front one of the first alignment layers is formed on a rear surface of the first front electrode layer 41, and a rear one of the first alignment layers 11 is formed on a front surface of a substrate 62. The first rear electrode layer 42, together with the first insulating layer 423, is sandwiched between the substrate 62 and a substrate 63.

Furthermore, the second front electrode layer 51 is formed on a rear surface of a substrate 64. A front one of the second alignment layers 21 is formed on a rear surface of the second front electrode layer 51, and a rear one of the second alignment layers 21 is formed on a front surface of a substrate 65. The second rear electrode layer 52, together with the second insulating layer 523, is sandwiched between the substrate 65 and a substrate 66.

Each of the substrates 61-66 is a light-transmissive substrate, such as a glass substrate or the like. The substrates 63, 64 may be joined to each other by a suitable adhesive.

Figure 2:
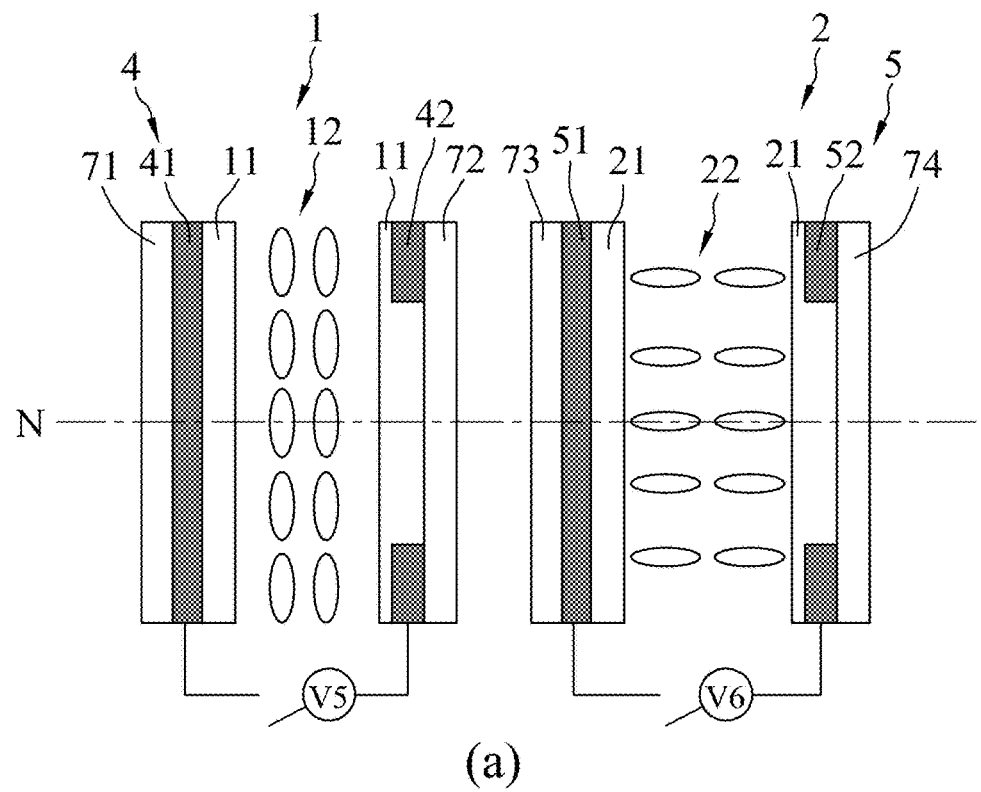
FIG. 2 is a schematic side view of an electrically tunable focusing achromatic lens according to a second embodiment of the disclosure.
Figure 2:
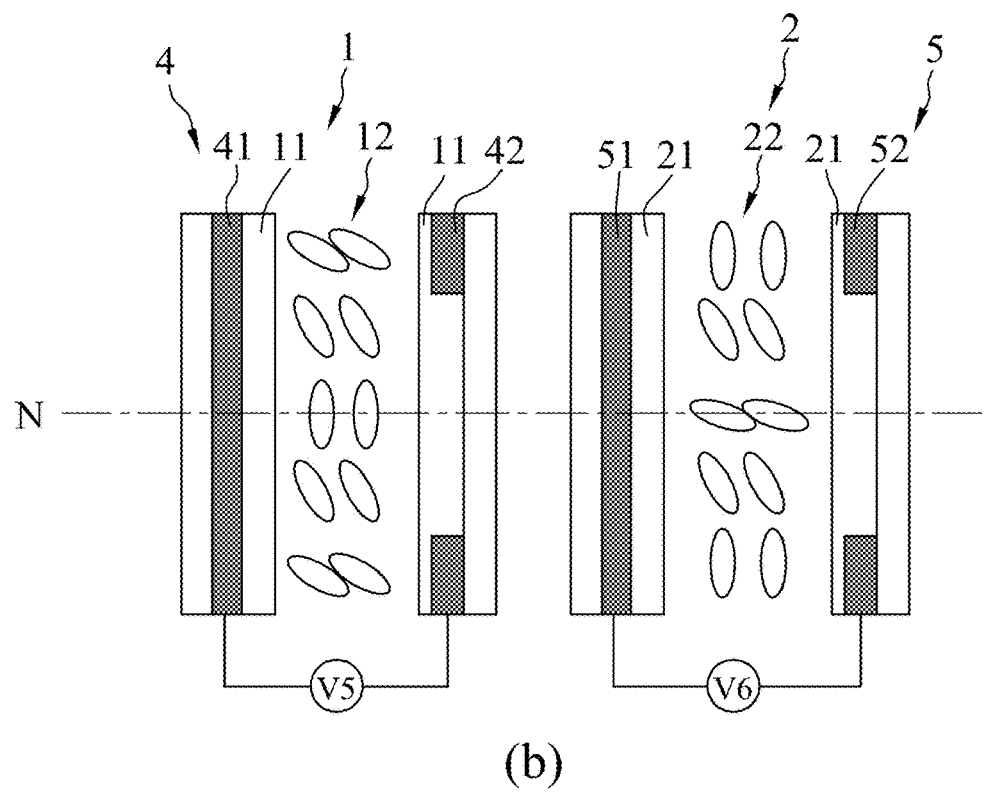

FIG. 2 illustrates an electrically tunable focusing achromatic lens according to a second embodiment of the disclosure. The second embodiment is similar to the first embodiment, except that in the second embodiment, one of the first and second dielectric anisotropies is positive and the other one of the first and second dielectric anisotropies is negative, and that the first orientation is orthogonal to the second orientation when no voltage is applied to each of the first and second liquid crystal cells 1, 2, as shown in FIG. 2(*a*). In addition, both of the first and second predetermined radially varying electric fields have a field gradient from high to low in the radial directions from the normal line (N), or a field gradient from low to high in the radial directions from the normal line (N).

In an embodiment shown in FIG. 2, each of the first and second rear electrode layers 42, 52 is a ring electrode surrounding the normal line (N). The first dielectric anisotropy is positive, and the second dielectric anisotropy is negative. As shown in FIG. 2(*b*), when a voltage (V5) is applied between the first front electrode layer 41 and the ring electrode 42 and when a voltage (V6) is applied between the second front electrode 51 and the ring electrode 52, each of the first and second predetermined radially varying electric fields have a field gradient from low to high in the radial directions from the normal line (N) to permit the first liquid crystal cell 1 to acquire the predetermined positive optical power, and to permit the second liquid crystal cell 2 to acquire the predetermined negative optical power.

In an embodiment shown in FIG. 2, the first front electrode layer 41 is formed on a rear surface of a substrate 71, and the ring electrode 42 is formed on a front surface of a substrate 72. A front one of the first alignment layers 11 is formed on a rear surface of the first front electrode layer 41, and a rear one of the first alignment layers 11 is formed on a front surface of the ring electrode 42.

Furthermore, the second front electrode layer 51 is formed on a rear surface of a substrate 73, and the ring electrode 52 is formed on a front surface of a substrate 74. A front one of the second alignment layers 21 is formed on a rear surface of the second front electrode layer 51, and a rear one of the second alignment layers 21 is formed on a front surface of the ring electrode 52.

Each of the substrates 71-74 is a light-transmissive substrate, such as a glass substrate or the like. The substrates 72, 73 may be joined to each other by a suitable adhesive.

Figure 3:
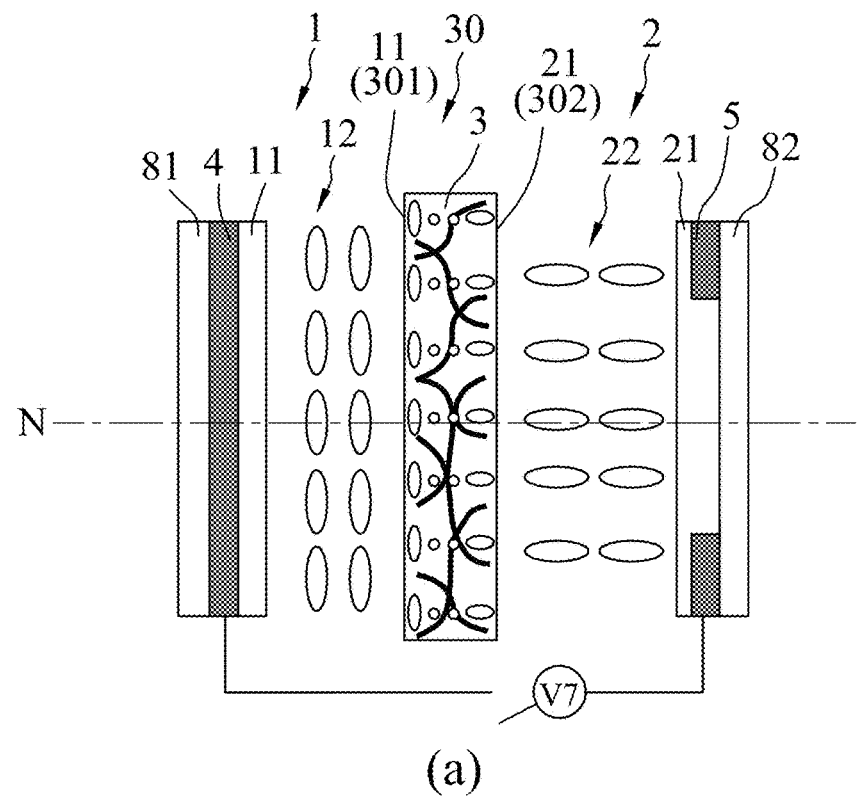
FIG. 3 is a schematic side view of an electrically tunable focusing achromatic lens according to a third embodiment of the disclosure.
Figure 3:
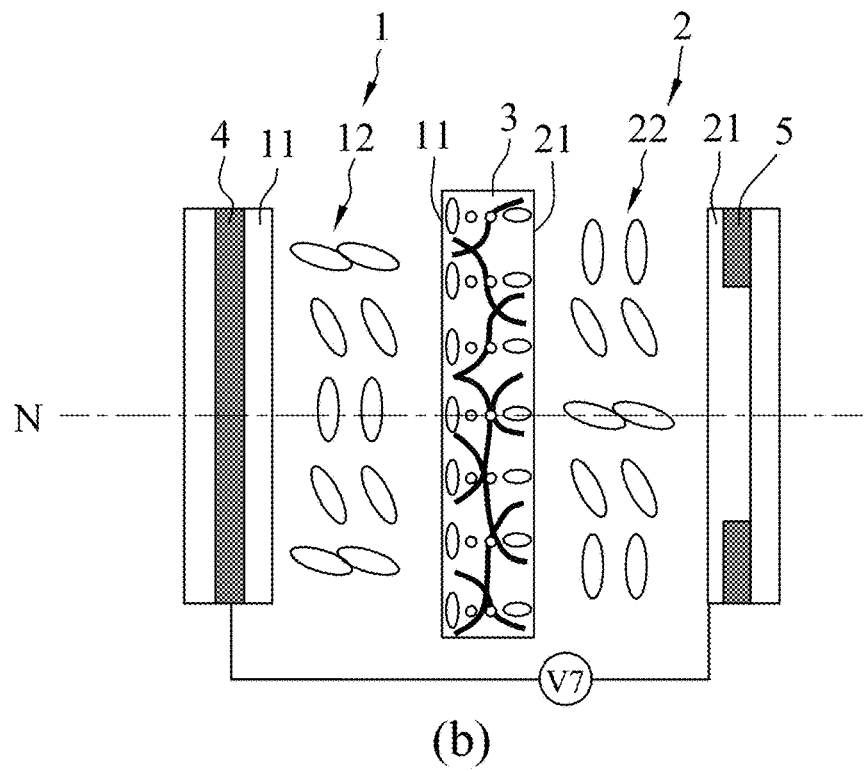

FIG. 3 illustrates an electrically tunable focusing achromatic lens according to a third embodiment of the disclosure. The third embodiment is similar to the second embodiment, except that in the third embodiment, the first and second liquid crystal cells 1, 2 are separated from each other by a cell separator 3, and that the first electrode layer unit 4 is a single electrode layer disposed forwardly of the first alignment layers 11, and the second electrode layer unit 5 is a ring electrode which surrounds the normal line (N), and which is disposed rearwardly of the second alignment layers 21 so as to generate a predetermined radially varying electric field unit to serve as a combination of the first and second predetermined radially varying electric fields.

In an embodiment shown in FIG. 3, a polymeric layer is used. The polymeric layer 30 may be the one disclosed by Y. H. Lin and H. S. Chen in an article entitled "Electrically tunable-focusing and polarizer-free liquid crystal lenses for ophthalmic applications," Opt Express 21(8), 9428-9436 (2013). A front surface 301 of the polymeric layer 30 serves as a rear one of the first alignment layers 11, while a rear surface 302 of the polymeric layer 30 serves as a front one of the second alignment layers 21 so as to permit a remaining part of the polymeric layer 30 between the front and rear surfaces 301, 302 to serve as the cell separator 3.

In an embodiment shown in FIG. 3, the first electrode layer unit 4 is formed on a rear surface of a substrate 81, and the second electrode layer unit 5 is formed on a front surface of a substrate 82. A front one of the first alignment layers 11 is formed on a rear surface of the first electrode layer unit 4, and the rear one of the second alignment layers 21 is formed on a front surface of the second electrode layer unit 5.

Each of the substrates 81, 82 is a light-transmissive substrate, such as a glass substrate or the like.

In other embodiments, the cell separator 3 may be a light-transmissive substrate, such as a glass substrate or the like, and a rear one of the first alignment layers 11 and a front one of the second alignment layers 21 may be respectively formed on front and rear surfaces of the cell separator 3.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An electrically tunable focusing achromatic lens comprising:
    a first liquid crystal cell for receiving an incident light, including
        a pair of first alignment layers which are spaced apart from each other along a normal line, and
        a plurality of first liquid crystal molecules which have a first dielectric anisotropy, and which are filled between and aligned by said first alignment layers to orient in a first orientation;
    a second liquid crystal cell which is disposed rearward of said first liquid crystal cell, and which includes a pair of second alignment layers which are spaced apart from each other along said normal line, and
        a plurality of second liquid crystal molecules which have a second dielectric anisotropy, and which are filled between and aligned by said second alignment layers to orient in a second orientation that is orthogonal to or parallel to said first orientation; and
    a first electrode layer unit and a second electrode layer unit, which are disposed to be separated from each other along said normal line, to supply voltage to said first and second liquid crystal cells, and which have two predetermined patterns so as to generate a first predetermined radially varying electric field across said first liquid crystal cell and a second predetermined radially varying electric field across said second liquid crystal cell,
    such that one of said first and second liquid crystal cells acquires a predetermined positive optical power and the other one of said first and second liquid crystal cells acquires a predetermined negative optical power which has an absolute value different from that of the predetermined positive optical power, to thereby set a predetermined focal length, and
    such that when the incident light is directed along said normal line and focused at a predetermined focal point determined by the predetermined focal length, chromatic aberration of said first liquid crystal cell can be counterbalanced by that of said second liquid crystal cell to thereby limit the effect of chromatic aberration at the predetermined focal point.

2. The electrically tunable focusing achromatic lens according to claim 1, wherein
    said first and second dielectric anisotropies are both positive or negative,
    said first orientation is parallel to said second orientation, and
    one of said first and second predetermined radially varying electric fields has a field gradient from high to low in radial directions from said normal line, while the other one of said first and second predetermined radially varying electric fields has a field gradient from low to high in the radial directions from said normal line.

3. The electrically tunable focusing achromatic lens according to claim 2, wherein
    said first electrode layer unit has a first front electrode layer and a first rear electrode layer, which are separated from each other along said normal line, and which are disposed forwardly and rearwardly of said first alignment layers, respectively, so as to generate said first predetermined radially varying electric field across said first liquid crystal cell, and said second electrode layer unit has a second front electrode layer and a second rear electrode layer, which are separated from each other along said normal line, and which are disposed forwardly and rearwardly of said second alignment layers, respectively, so as to generate said second predetermined radially varying electric field across said second liquid crystal cell.

4. The electrically tunable focusing achromatic lens according to claim 1, wherein
one of said first and second dielectric anisotropies is positive and the other one of said first and second dielectric anisotropies is negative,
said first orientation is orthogonal to said second orientation, and
both of said first and second predetermined radially varying electric fields have a field gradient from high to low in radial directions from said normal line, or a field gradient from low to high in the radial directions from said normal line.

5. The electrically tunable focusing achromatic lens according to claim 4, wherein
said first electrode layer unit has a first front electrode layer and a first rear electrode layer, which are separated from each other along said normal line, and which are disposed forwardly and rearwardly of said first alignment layers, respectively, so as to generate said first predetermined radially varying electric field across said first liquid crystal cell, and
said second electrode layer unit has a second front electrode layer and a second rear electrode layer, which are separated from each other along said normal line, and which are disposed forwardly and rearwardly of said second alignment layers, respectively, so as to generate said second predetermined radially varying electric field across said second liquid crystal cell.

6. The electrically tunable focusing achromatic lens according to claim 4, wherein
said first and second liquid crystal cells are separated from each other by a cell separator, and
said first electrode layer unit is disposed forwardly of said first alignment layers, and said second electrode layer unit is disposed rearwardly of said second alignment layers so as to generate a predetermined radially varying electric field unit to serve as a combination of said first and second predetermined radially varying electric fields.

* * * * *